Dec. 25, 1934.  J. T. WELSH  1,985,591
SEPARATION OF OIL
Filed Oct. 2, 1931   2 Sheets-Sheet 1
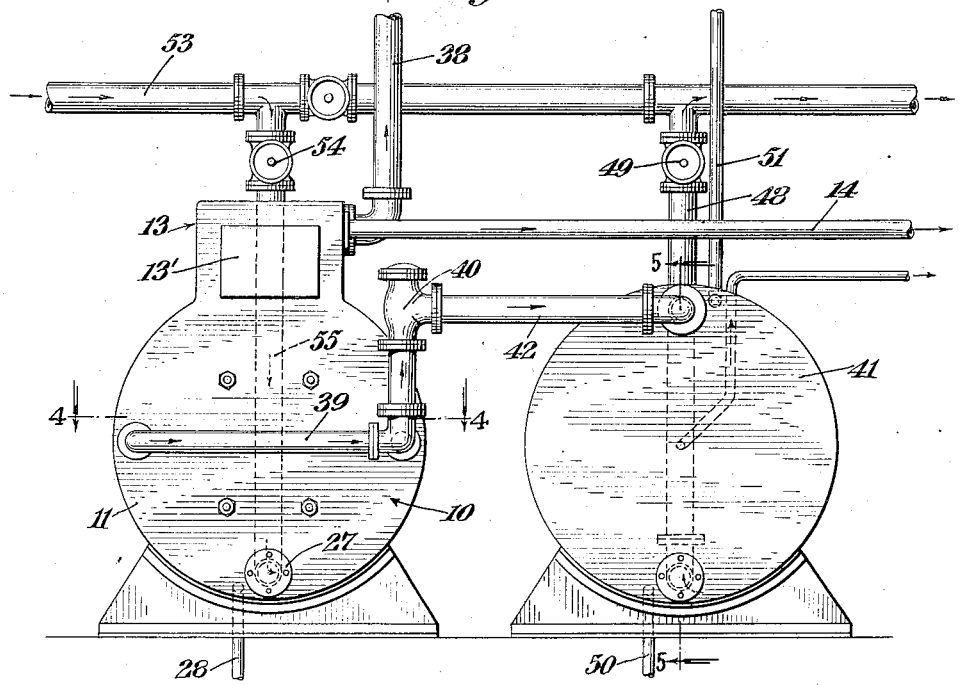
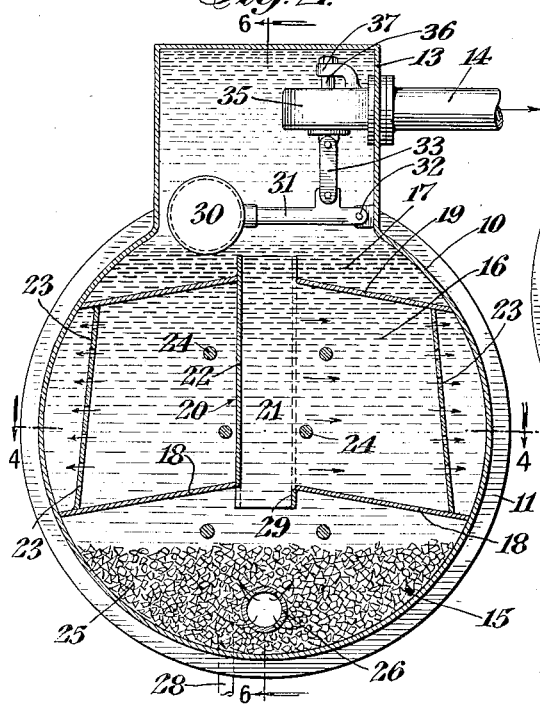
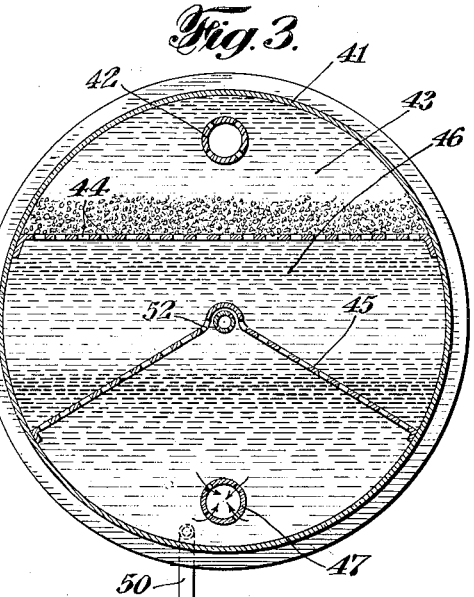
INVENTOR
John T. Welsh
BY Kenyon & Kenyon
ATTORNEYS.

Dec. 25, 1934.   J. T. WELSH   1,985,591
SEPARATION OF OIL
Filed Oct. 2, 1931   2 Sheets-Sheet 2
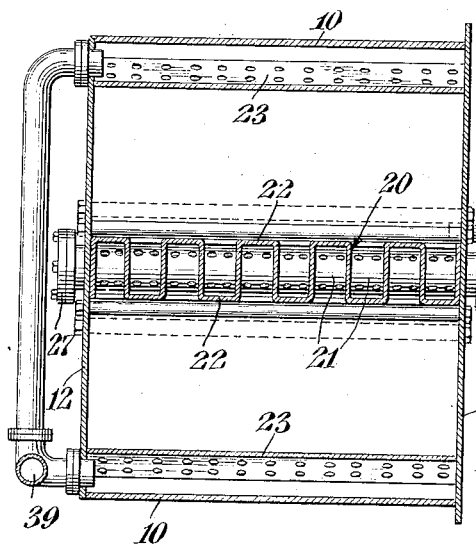
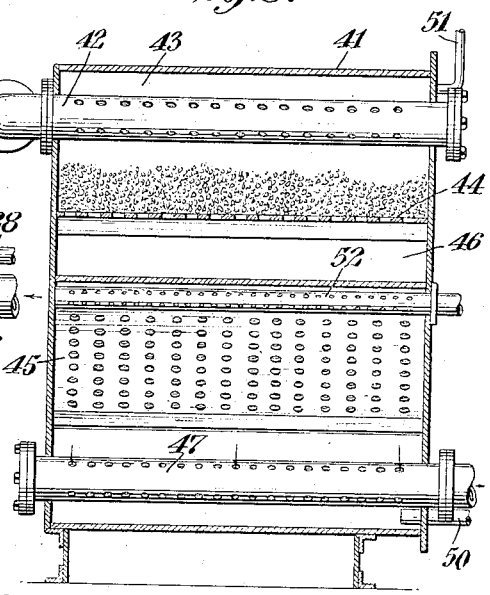
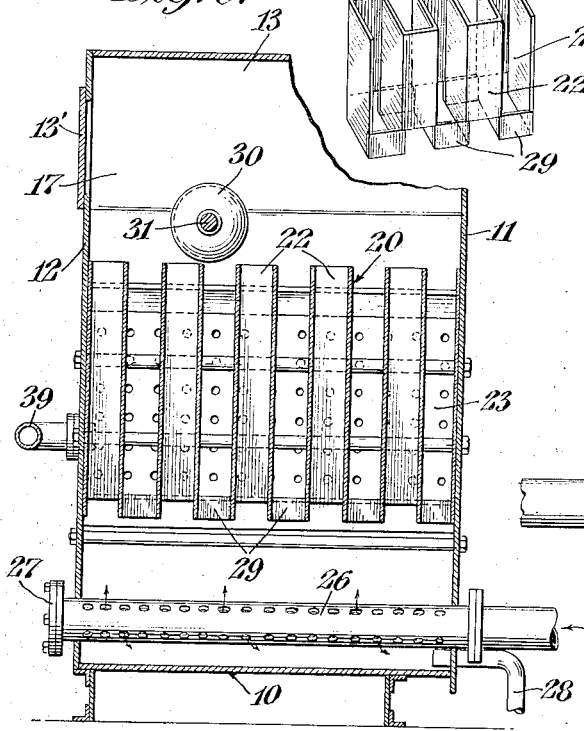
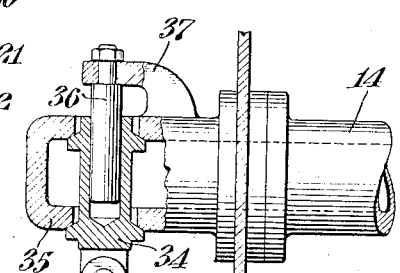
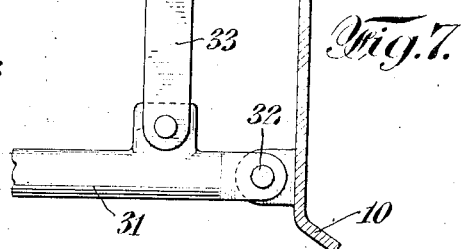
INVENTOR
John T. Welsh
BY Kenyon & Kenyon
ATTORNEYS.

Patented Dec. 25, 1934

1,985,591

UNITED STATES PATENT OFFICE 1,985,591

SEPARATION OF OIL

John T. Welsh, Ridgway, Pa.

Application October 2, 1931, Serial No. 566,519

9 Claims. (Cl. 210—54)

This invention relates to a method of and apparatus for the separation of oil from water and other impurities with particular reference to the recovery of oil from contaminated ballast and bilge water aboard a ship.

An object of this invention is to separate the oil from oil contaminated water irrespective of the state of the oil in the water and of the relative proportions between the two, and a further object of this invention is to provide against the oil having to recross the water current after it has once been separated. Still another object and advantage of this invention is the spreading out and division of the oil contaminated water so that every encouragement is given the oil to separate therefrom.

A feature of this invention is that the velocity of flow is at a minimum with respect to the volume of flow, and, furthermore, the operation of the device is both continuous and automatic. This invention also features the provision for preventing water from running into the settling tanks, and a still further feature of this invention is that by this invention a ship may discharge its ballast or bilge waters in port without fear of contaminating the surrounding waters with oil.

In accordance with this invention, oil contaminated ballast or bilge water is passed through a bed of stone or broken crockery so that the particles of floating oil will tend to separate therefrom and the constant division of the body of water will also materially aid in amalgamating some suspended and emulsified oil with the particles of free oil, whereupon all this oil will rise in a vertical chimney to the top of the tank to be discharged into the ship's settling tanks. Dirt and other sediment are usually deposited in the very bottom of the separator prior to the water passing upward through the stone bed. The chimney also divides the water current, which passes transversely in layers moving in opposite oblique directions, so that particles of oil in the stream will rise all along the path of flow until they meet with sloping partitions, conducting the oil to an oil dome atop the first tank.

The contaminated water, now substantially freed from all floating oil, is led into the top of a second tank and spread out as it passes downward through a stratum of light oil whereby the remaining discernible oil in the water is brought into intimate contact with the light oil, so with the affinity of oil for oil the suspended and emulsified oil content of the water is separated out and forms a heavier stratum immediately below the light oil. The clear water moves to the bottom of the tank, where it is discharged.

The intermediate stratum in this second tank is drawn out and recirculated through the first tank, whereupon the remainder of the oil is collected in the oil dome from whence it too passes to the ship's settlers. Also, other provision is made at various places in this apparatus for constantly dividing and spreading the water flow so that every opportunity is afforded the oil to separate itself from the accompanying water where it may rise to be collected.

Other and further objects and advantages of this invention will appear from the following description of apparatus embodying the invention, which is set forth mainly as an illustrative embodiment thereof with the intention that this embodiment is not to be limited to its details, nor to the strict use described. Further features may be observed from the drawings, in which Fig. 1 is a view in elevation of the apparatus of this invention connected for operation;

Fig. 2 is a cross sectional view of the first oil separating tank illustrating the collecting dome;

Fig. 3 is a cross sectional view of the second unit of the apparatus;

Fig. 4 is a cross sectional view of the first tank in plan, taken on the line 4—4 of Fig. 1;

Fig. 5 is a vertical cross sectional view of the second tank taken on line 5—5 of Fig. 1;

Fig. 6 is a view taken on line 6—6 of Fig. 2;

Fig. 7 is a detailed view in cross section of the float valve in the oil dome of the first separating tank, and Fig. 8 is a perspective detail of the corrugated riser chimney of the first separating tank.

Referring to the drawings, 10 indicates the substantially circular shell of the first separating tank with the welded heads 11 and 12 affixed thereto. A rectangular dome 13 extends the entire length of the tank on top and serves as a collection chamber for the separated oil which is then pumped through line 14 to the ship settlers where the remainder of the dirt and sediment in the oil is deposited. Cover plate 13' provides for inspection opening. Tank 10 is divided into three compartments; a lower one 15, an intermediate compartment 16 and an upper compartment 17, the last incorporating the space provided in dome 13.

Sloping partitions 18 and 19 divide this intermediate compartment 16 from the lower compartment 15 and the upper one 17 respectively. These partitions slope upward toward the center of the tank from each side of the shell and are connected together by a corrugated riser chimney 20 (see Fig. 8) which comprises a series of passes 21 having alternately disposed rear walls 22 running between upper partitions 19 and the lower ones 18. Along both sides of intermediate compartment 16 are inwardly sloping perforated partitions 23 connected at the outer ends of partitions 18 and 19 and extending from one end of the tank to the other. The stay bolts 24 help to maintain the entire apparatus together as a unit.

Lower compartment 15 is approximately half filled with a bed of treated stone or broken crockery 25 which serves to divide the current of oil contaminated water as it comes out of inlet pipe 26, so that the floating oil and some suspended and emulsified oil is encouraged to separate from the water. Perforated pipe 26 extends through the tank 10 and is closed at one end by a flange plate 27. Drain 28 is provided in the bottom of this tank.

In member 20 the backs 22 of the successive passes 21 are alternately disposed. Thus every other pass has a back 22 connecting the same set of partitions 18 and 19 on one side of the tank 10. Each back 22 does not extend down beyond partitions 18 but on the open face of each pass there is a bar 29 extending from the proper partition 18 downwards a short distance to the bottom of riser chimney 20 to facilitate flow from one side of compartment 15 to the opposite side of compartment 16 and hinder as much as possible a different flow current. Thus, along the full length of tank 10, alternate passes will conduct alternate layers of water in one direction, and the remaining series of passes in the opposite direction.

Oil rising in chimney 20 passes into the upper compartment 17 and collects in dome 13, where it is discharged into the ship's settling tanks. As long as there is no water in compartment 17 above the top of member 20, float 30 will keep valve 34 and pipe 14 open so that the oil may pass thereout. Float 30 is connected by an arm 31 pivoted at 32, to link 33 directly secured to a piston valve 34 seated on member 35. Valve 34 is guided by a rod 36 supported at 37 to the side of the tank. The operation of this valve is such that when float 30 sinks valve 34 is open and the oil in the dome may pass out through the pipe 14, as explained above. A vent 38 is connected in the usual way to the dome 13 of tank 10. This apparatus just described will substantially separate all the floating oil from the oil contaminating water and a portion of the suspended and emulsified oil, all of which rises into dome 13 or compartment 17 while the water continues to flow through intermediate compartment 16 and then out of tank 10.

The water in compartment 16 is drawn out from both sides by pipe 39 and is led upward through a spring-loaded check valve 40 designed to keep a constant head in tank 10 into the top of a second tank 41 by means of inlet pipe 42. The entire delivery of inlet 42 passes through an upper stratum of light oil 43 and loosely packed cocoa fibre or ground cork 43' which helps to spread out the flow of oil and water and bring all particles of the oil entrained by the water into intimate contact with this light oil 43. The loosely packed material 43' prevents any tendency of the incoming liquids to form a channel through light oil layer 43 hindering oil to oil contact. A horizontal perforated partition 44 substantially dividing one part of the tank 41 from another, also aids in dividing the body of incoming water and oil and in aiding the light oil to separate suspended and emulsified oils from the water, owing to the affinity of oil for oil. Substantially oil free water passes downward through a second perforated partition 45 sloping upwards from the outer edges to a peak in the center of tank 41 which will separate any oil not caught above by the light oil 43 and partition 44 as well as by the stratum 46 which forms immediately below the layer of light oil 43 and is comprised of the heavier oils recently separated from the water in which they had been entrained in suspended and emulsified states and even in floating condition. The waste water continues downward and is pumped out through pipe 47 which is similar in construction to pipe 26, upwards through pipe 48 and valve 49 to the discharge port in the side of the vessel. With this tank 41 there are associated similarly a drain 50 in the bottom of the tank and a vent 51 at the top thereof, according to usual practice.

Thus in tank 41, there is an upper layer of light oil 43, an intermediate layer of heavier oils freed from the contaminated ballast or bilge 46 and a lowermost stratum of waste water which is being continuously pumped out during the operation of the separator. Extending to the end of tank 41, just below the peak of the sloping partition 45, is a small perforated pipe 52 which draws out layer 46 in tank 41 and leads it back (pipe connections not shown) into the suction end of the pump (also not illustrated) where it may be recirculated again through tank 10, entering in the usual manner by pipe 26. And as this oil is now in a substantially free or floating state it will immediately rise to dome 13 where it, too, can pass to the ship's settlers through pipe 14.

The operation of this device is substantially as follows: Oil contaminated ballast or bilge water is pumped (by means not illustrated) through pipe 53, through valve 54, downward through pipe 55 connected with the perforated inlet pipe 26 and into tank 10. Passing upward through stone bed 25 the water is divided and re-divided so that the flotation of oil is assisted and even emulsified and suspended oils in the mixture are amalgamated with the particles of floating oil so that when the current reaches the chimney 20 this floating oil will pass directly and vertically upwards into compartment 17 and never re-cross the water current.

Owing to the co-operation in each pass of the corrugated chimney 20 of members 29 and backs 22, the upwardly moving water on one side of compartment 15 will flow obliquely under upwardly sloping partition 18, through a small portion of chimney 20 and out into the opposite side of intermediate compartment 16 between upper and lower partitions 19 and 18 respectively. A similar flow by the water on the other side of compartment 15 is hindered by bar 29 depending from the under side of partition 18 and the back 22. Alternate passes 21 direct one current of oblique flow while the remaining set directs the flow in the other direction, so that a series of interposed water layers flowing in opposite directions is obtained.

When the particles of oil reach vertical pass 21 of chimney 20 they will rise upward and furthermore any free oil collecting beneath the sloping partitions 18 or 19 or on surfaces 23 will slide upwardly toward the center until they, too, reach the vertical pass leading directly into the oil dome 13. The current of water, meanwhile, is flowing through the inwardly sloping perforated partitions 23 and outwards into the areas defined by the tank shell 10, and the partitions 23. This water is still carrying much of the suspended and emulsified oil and passes into a second tank 41 which upon its entering at the top thereof encounters a layer of light oil 43 distributed between the particles of loosely packed material 43' such as cocoa fibre or ground cork, which attracts the particles of suspended and emulsified oil in the water so that they settle out in a lower stratum 46 immediately therebelow. The loosely packed bed 43′ divides the flow of water so that the light oil has an opportunity to properly mingle. Partitions 44 and 45 further assist in this work permitting only waste water to settle in the bottom of tank 41 where it is discharged through pipe 47. Intermediate layer 46 is pumped into the supply line of the first tank 10 and recirculated to separate the oil therein and now in a floating state.

All oil flowing into dome 13, that is compartment 17, passes out through valve 34 into a line 14 leading directly to the ship's settling tanks where the remainder of dirt and sediment is deposited and the oil used for fuel and other purposes. If on any occasion water rises into compartment 17, float 30 will rise closing valve 34 and preventing water from discharging into the settling tanks. Furthermore, valve 34 will not reopen until enough water leaves compartment 17. The head in tank 10 is maintained at all times by the spring-loaded check valve 40 in the line 39 between intermediate compartment 16 and the second tank 41 of the system.

The embodiment of this invention which is described is susceptible of change by one skilled in the art, and such changes are expressly within the spirit of the invention as defined by the appended claims.

I claim:

1. A device of the character described comprising a tank having a lower, an intermediate and an upper compartment, a vertical member dividing the intermediate compartment into two chambers and extending into the upper and lower compartments, means to direct the influent into said vertical member, said vertical member being shaped to provide two sets of vertical channels leading from the lower to the upper compartment, any two successive channels directing the flow in opposite directions, said sets being in communication with different chambers throughout the full height of the chambers, an inlet for said lower compartment and outlets for said chambers and said upper compartment.

2. A device of the character described comprising a tank having a lower, an intermediate and an upper compartment, a corrugated member dividing the intermediate compartment into two chambers and extending into the upper and lower compartments, means to direct the influent into said corrugated member, said member being shaped to provide two sets of vertical channels leading from the lower to the upper compartment, any two successive channels directing the flow in opposite directions, said sets being in communication with different chambers throughout the full height of the chambers, the portions of the channels extending into the lower compartment being faced oppositely to the portions therein in the intermediate compartment, an inlet for said lower compartment and outlets for said chambers and said upper compartment.

3. A device of the character described comprising a tank having partitions forming a lower, an intermediate and an upper compartment, a baffle plate extending between said partitions and dividing said intermediate compartment into two chambers, said baffle plate being shaped to provide two sets of laterally open vertical channels connecting the lower and upper compartments and communicating with different chambers throughout the height thereof, an inlet for said lower compartment, and outlets for said chambers and said upper compartment.

4. A device of the character described comprising a tank divided into lower, intermediate and upper compartments by partitions, a baffle member extending through the lower partition and dividing the intermediate compartment into two chambers, said baffle member being shaped to provide two sets of vertical channels leading from the lower to the upper compartment with portions opening laterally into different chambers and portions opening oppositely into the lower compartment, an inlet for said lower compartment, and outlets for said chambers and said upper compartment.

5. A device of the character described comprising a tank having partitions dividing it into a lower, an intermediate and an upper compartment, a baffle member extending through the lower partition and dividing the intermediate compartment into two chambers, said member being shaped to provide two sets of vertical troughs opening laterally into different chambers, and oppositely facing troughs in the lower compartment communicating with said first trough, an inlet for said lower compartment, and outlets for said chambers and said upper compartment.

6. A device of the character described comprising a tank having partitions dividing it into a lower, an intermediate and an upper compartment, a baffle member extending through said partitions and dividing the intermediate compartment into two chambers, said baffle member having that portion of it between partitions shaped to provide vertical troughs opening laterally into said compartments and having that portion below the lower partition shaped to provide oppositely arranged vertical troughs opening into the lower compartment and communicating with said first trough.

7. In an oil separator comprising a tank, a lower, an intermediate and an upper compartment in said tank, a vertical corrugated member connecting the upper and lower compartments and dividing the intermediate compartments into separate chambers, channels in said member, successive ones communicating with separate chambers, alternate ones with the same chamber throughout the full height of the chambers but extending a short distance into the lower compartment to present an open side in a direction away from the chamber with which it communicates.

8. In a device of the character described comprising a tank, a lower, an intermediate and an upper compartment in said tank, partitions between said compartments a channeled member of castellated cross-section connecting the upper and lower compartments and dividing the intermediate compartment into two chambers, that portion of the channeled member below the lower portion of the intermediate compartment being castellated in a reverse manner.

9. The method of separating oil from oil-contaminated water consisting in continually dividing this water as it passes upwards to amalgamate oil particles, dividing the body of water into lateral layers and passing any two successive layers in opposite directions to afford the floating oil a chance to rise to an upper chamber where it is collected, discharging the water into a stratum of light oil with an affinity for the oil particles still remaining in the water whether floating, suspended or emulsified, and drawing out the stratum containing the separated oil.

JOHN T. WELSH.

CERTIFICATE OF CORRECTION.

Patent No. 1,985,591. December 25, 1934.

JOHN T. WELSH.

It is hereby certified that error appears in the printed specification of the above numbered patent requiring correction as follows: Page 2, first column, line 43, for "contaminating" read contaminated; page 3, second column, line 45, claim 7, after "with" insert the word said; and line 60, claim 8, for "portion" read partition; and that the said Letters Patent should be read with these corrections therein that the same may conform to the record of the case in the Patent Office.

Signed and sealed this 12th day of February, A. D. 1935.

(Seal)
Leslie Frazer
Acting Commissioner of Patents.